Patented July 12, 1932

1,867,083

UNITED STATES PATENT OFFICE

HANS KRZIKALLA, OF MANNHEIM, AND KARL HOLZACH AND WERNER MUELLER, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF COMPLEX METAL COMPOUNDS OF O-HYDROXYAZO DYESTUFFS

No Drawing. Application filed March 8, 1929, Serial No. 345,591, and in Germany March 10, 1928.

The present invention relates to the production of complex metal compounds of o-hydroxymonoazo dyestuffs.

We have found that valuable complex metal compounds with very good tinctorial properties are obtained by treating with metal compounds capable of forming complex metal compounds with o-hydroxyazo dyestuffs, such as for example chromium or copper compounds, the o-hydroxymonoazo dyestuffs obtainable by coupling a diazotized sulfonated o-hydroxyamino compound which term is meant to comprise o-aminophenols, o-aminonaphthols, and derivatives thereof which are free from carboxylic acid groups, with an unsulfonated phenol derivative substituted in the para position to the hydroxyl group and free from carboxylic acid and amino groups, the diazo compound being linked to the ortho-position with respect to the hydroxyl group of the phenol compound.

Phenol derivatives according to the present invention comprise for example, p-cresol, p-chlorphenol, p-chlor-m-cresol ($CH_3 : OH : Cl = 1 : 3 : 6$), 2.4-dimenthyl-phenol (asymmetric-m-xylenol), 2.4.5-trimethyl-phenol (pseudocumenol); also p-oxy-diphenylmethane and others.

The formation of the said complex compounds may be carried out for instance by boiling the azo dyestuffs with the said metal compounds under a reflux condenser or by heating under pressure. The new complex metal compounds dye wool in most cases yellow brown to violet shades and are distinguished by their fastness and good equalizing properties. They may also be used for other purposes for instance for dyeing leather, printing of cotton, or the production of colour lakes.

The following examples will further illustrate the nature of this invention but the invention is not restricted to these examples. The parts are by weight.

Example 1

35 parts of the o-hydroxy-azo dyestuff of the formula:

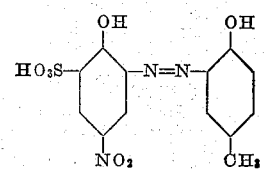

obtainable from diazotized 4-nitro-2-aminophenol-6-sulfonic acid and p-cresol are heated for 2 hours to 115° centigrade in aqueous solution with 33 parts of a chromium hydroxide paste containing 26 per cent of chromium oxide, and 17 parts of formic acid of 85 per cent strength. After cooling the dyestuff is salted out, filtered and dried as usual and furnishes on leather or wool handsome, even brown shades excellently fast to light. The chromium compound of the o-hydroxyazo dyestuff of the formula:

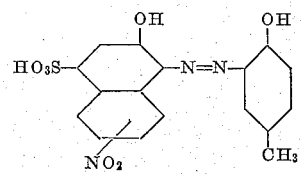

obtainable from nitrated 1-diazo-2-naphthol-4-sulfonic acid and p-cresol produced in a similar manner dyes wool brown violet shades. Other metal compounds of the dyestuff, for instance copper compounds can be produced in the manner described.

Example 2

38.8 parts of the o-hydroxyazo dyestuff obtainable from diazotized 4-nitro-2-aminophenol-6-sulfonic acid and 1-methyl-3- hydroxy-6-chlorbenzene and corresponding to the formula:

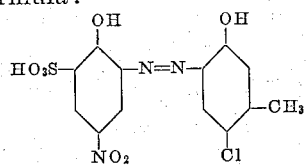

are boiled in aqueous solution with about the same amount of chromium hydroxide paste and formic acid as disclosed in the foregoing example, and salted out. The dyestuff thus obtained dyes leather handsome yellow brown shades of excellent fastness. In the same or a similar manner other o-hydroxyazo dyestuffs containing as coupling components a phenol or a derivative thereof substituted in the p-position to the hydroxy group, may be transformed into complex metal compounds.

*Example 3*

37 parts of the azo dyestuff of the formula:

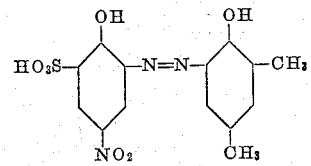

obtainable from diazotized 4-nitro-2-aminophenol-6-sulfonic acid and asymmetric-m-xylenol (4-hydroxy-1.3-dimethylbenzene) are heated for 2 hours to about 120° centigrade in an enamelled pressure vessel with 500 parts of water and a solution of chromium formate corresponding to 10 parts of chromium oxide. The reaction mixture is allowed to cool, saturated with common salt, and the deposited dyestuff filtered off. The product is, after drying, in the form of a grey black powder, dissolving to a yellow brown solution in water and a reddish brown solution in concentrated sulfuric acid, and dyes wool from the acid bath very even deep brown shades which are very fast against washing, fulling and light.

If the dyestuff obtainable from 6-nitro-2-aminophenol-4-sulfonic acid and asymmetrical-m-xylenol be treated with chromium formate in an analogous manner a new dyestuff of similar properties is obtained dyeing, however, a little more reddish shades.

*Example 4*

The solution of 38 parts of the o-hydroxyazo dyestuff corresponding to the formula:

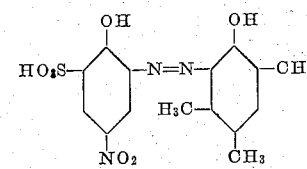

obtainable from 4-nitro-2-aminophenol-6-sulfonic acid and pseudocumenol (5-hydroxy-1.2.4-trimethylbenzene) in 600 parts of water, is heated for 2 to 3 hours to about 120° centigrade under pressure with 10 parts of chromium oxide in the form of freshly precipitated hydroxide and 25 parts of formic acid. On cooling and salting out the complex chromium compound of the dyestuff separates and is filtered by suction. The new dyestuff dissolves in water to a deep brown solution and to an olive yellow solution in concentrated sulfuric acid and dyes wool from the acid bath very even olive brown shades of excellent fastness.

The chromium compound of the dyestuff obtainable from 4-chlor-2-aminophenol-6-sulfonic acid and pseudocumenol produced in a similar manner dyes wool brown shades.

*Example 5*

1 molecular proportion of the o-hydroxyazo dyestuff obtainable from diazotized 4-nitro-2-aminophenol-6-sulfonic acid and p-chlorphenol and corresponding to the formula:

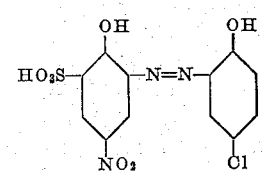

is boiled for about 3 hours under a reflux condenser with an aqueous solution of 1.1 molecular proportion of copper formate. The dyestuff is salted out and filtered and after drying is in the form of a brownish powder dyeing leather fast red brown shades. The chromium compound obtained from the same initial material in the manner described dyes wool yellow brown shades of good fastness properties.

What we claim is:—

1. As a new article of manufacture complex metal compounds of o-hydroxymonoazo dyestuffs obtainable from a diazotized o-hydroxyamino derivative of a compound selected from the group consisting of benzene and naphthalene substituted by a nitro and a sulphonic acid group, and monohydroxy benzene coupling in the ortho position to the hydroxy group and substituted at least in the para position to the hydroxy group by a substituent selected from the group consisting of halogen, alkyl- and aralkyl-groups.

2. As a new article of manufacture complex metal compounds of o-hydroxymonoazo dyestuffs obtainable from a diazotized o-hydroxyamino derivative of benzene substituted by a nitro and a sulphonic acid group and monohydroxy benzene coupling in the ortho position to the hydroxy group and substituted at least in the para position to the hydroxy group by halogen or a methyl group.

3. As a new article of manufacture complex chromium compounds of o-hydroxymonoazo dyestuffs obtainable from a diazotized o-hydroxyamino derivative of benzene substituted by a nitro and a sulphonic acid group, and monohydroxy benzene coupling in the ortho position to the hydroxy group and substituted at least in the para position to the hydroxy group by halogen or a methyl group.

4. As a new article of manufacture the complex chromium compound of the o-hydroxyazo dyestuff corresponding to the formula

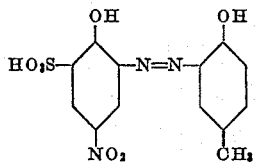

dyeing wool and leather brown shades.

In testimony whereof we have hereunto set our hands.

HANS KRZIKALLA.
KARL HOLZACH.
WERNER MUELLER.